US009626654B2

United States Patent
Tang et al.

(10) Patent No.: US 9,626,654 B2
(45) Date of Patent: Apr. 18, 2017

(54) LEARNING A RANKING MODEL USING INTERACTIONS OF A USER WITH A JOBS LIST

(71) Applicant: LinkedIn Corporation, Mountain View, CA (US)

(72) Inventors: Lijun Tang, Mountain View, CA (US); Eric Huang, San Francisco, CA (US); Xu Miao, Sunnyvale, CA (US); Yitong Zhou, Sunnyvale, CA (US); David Hardtke, Oakland, CA (US); Joel Daniel Young, Milpitas, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 0 days.

(21) Appl. No.: 14/788,711

(22) Filed: Jun. 30, 2015

(65) Prior Publication Data

US 2017/0004454 A1    Jan. 5, 2017

(51) Int. Cl.
*G06F 15/18*   (2006.01)
*G06Q 10/10*   (2012.01)
*G06F 17/30*   (2006.01)
*G06N 99/00*   (2010.01)
*G06Q 50/00*   (2012.01)

(52) U.S. Cl.
CPC ..... *G06Q 10/1053* (2013.01); *G06F 17/3053* (2013.01); *G06F 17/30867* (2013.01); *G06N 99/005* (2013.01); *G06Q 50/01* (2013.01)

(58) Field of Classification Search
CPC ....................... G06Q 10/063112; H04L 67/306
USPC ............................................ 706/125, 45, 62
See application file for complete search history.

(56) References Cited

U.S. PATENT DOCUMENTS

| | | | | |
|---|---|---|---|---|
| 7,454,357 B2 * | 11/2008 | Buckwalter | ............ | G06Q 30/02 705/346 |
| 7,925,651 B2 * | 4/2011 | Burges | .............. | G06F 17/30675 707/723 |
| 8,661,030 B2 * | 2/2014 | El-Saban | .......... | G06F 17/30696 707/723 |
| 8,713,000 B1 * | 4/2014 | Elman | .................... | G06Q 30/08 705/321 |
| 8,909,564 B1 | 12/2014 | Kaplow et al. | | |

(Continued)

OTHER PUBLICATIONS

Burdett, A Theory of Employee Job Search and Quit Rates, 1978, The American Economic Review, pp. 1-10.*

(Continued)

*Primary Examiner* — David Vincent
(74) *Attorney, Agent, or Firm* — Schwegman Lundberg & Woessner, P.A.

(57) ABSTRACT

Learning to rank modeling in the context of an on-line social network is described. A learning to rank model can learn from pairwise preference (e.g., job posting A is more relevant than job posting B for a particular member profile) thus directly optimizing for the rank order of job postings for each member profile. With ranking position taken into consideration during training, top-ranked job postings may be treated by a recommendation system as being of more importance than lower-ranked job postings. In addition, a learning to rank approach may also result in an equal optimization across all member profiles and help minimize bias towards those member profiles that have been paired with a larger number of job postings.

20 Claims, 6 Drawing Sheets

(56) References Cited

U.S. PATENT DOCUMENTS

| | | | |
|---|---|---|---|
| 2002/0055866 A1* | 5/2002 | Dewar | G06Q 10/063112 |
| | | | 705/7.38 |
| 2007/0233435 A1* | 10/2007 | Bradski | G06F 17/18 |
| | | | 703/2 |
| 2009/0319450 A1* | 12/2009 | Teramoto | G06F 19/24 |
| | | | 706/12 |
| 2011/0010224 A1 | 1/2011 | Gupta et al. | |
| 2011/0131085 A1* | 6/2011 | Wey | G06Q 30/02 |
| | | | 705/14.16 |
| 2014/0278130 A1* | 9/2014 | Bowles | G01N 33/15 |
| | | | 702/19 |
| 2015/0006422 A1* | 1/2015 | Carter | G06Q 50/01 |
| | | | 705/321 |
| 2015/0127565 A1 | 5/2015 | Chevalier et al. | |

OTHER PUBLICATIONS

Mason, et al., Boosting Algorithms as Gradient Descent in Function Space, 1999, pp. 1-29.*

"U.S. Appl. No. 14/788,717, Final Office Action mailed Apr. 27, 2016", 23 pgs.

"U.S. Appl. No. 14/788,717, Response filed Jul. 27, 2016 to Final Office Action mailed Apr. 27, 2016", 8 pgs.

"U.S. Appl. No. 14/788,717, Examiner Interview Summary mailed Jan. 15, 2016", 3 pgs.

"U.S. Appl. No. 14/788,717, Non Final Office Action mailed Aug. 31, 2015", 15 pgs.

"U.S. Appl. No. 14/788,717, Response filed Dec. 31, 2015 to Non Final Office Action mailed Aug. 31, 2015", 12 pgs.

\* cited by examiner

LEARNING A RANKING MODEL USING INTERACTIONS OF A USER WITH A JOBS LIST

TECHNICAL FIELD

This application relates to the technical fields of software and/or hardware technology and, in one example embodiment, to learning to rank modeling in the context of on-line social network data.

BACKGROUND

An on-line social network may be viewed as a platform to connect people in virtual space. An on-line social network may be a web-based platform, such as, e.g., a social networking web site, and may be accessed by a use via a web browser or via a mobile application provided on a mobile phone, a tablet, etc. An on-line social network may be a business-focused social network that is designed specifically for the business community, where registered members establish and document networks of people they know and trust professionally. Each registered member may be represented by a member profile. A member profile may be include one or more web pages, or a structured representation of the member's information in XML (Extensible Markup Language), JSON (JavaScript Object Notation), etc. A member's profile web page of a social networking web site may emphasize employment history and education of the associated member. An on-line social network may include one or more components for matching member profiles with those job postings that may be of interest to the associated member.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
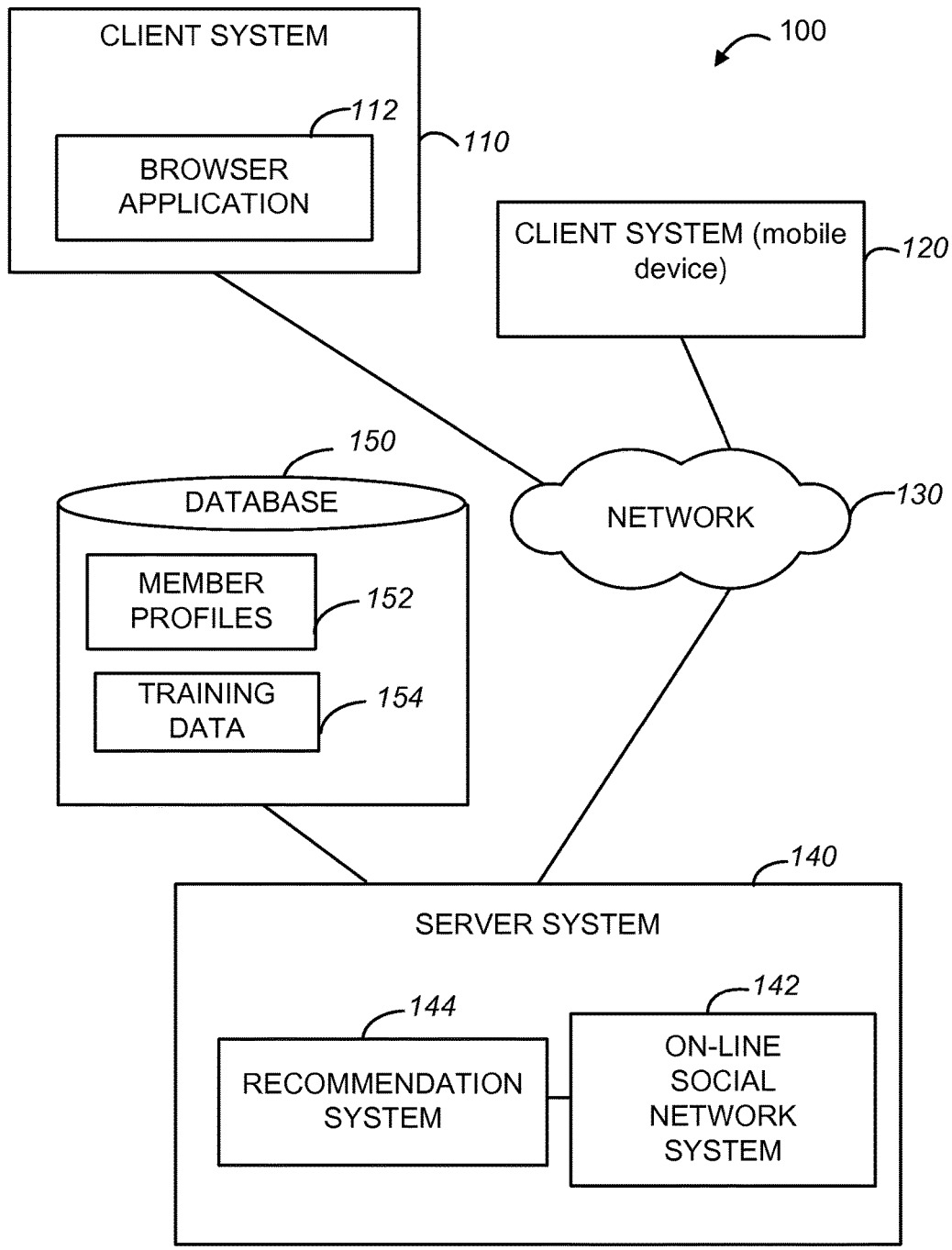
FIG. 1 is a diagrammatic representation of a network environment within which an example method and system to utilize learning to rank modeling in the context of an on-line social network data may be implemented.

Learning to rank modeling in the context of an on-line social network is described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

For the purposes of this description the phrase "an on-line social networking application" may be referred to as and used interchangeably with the phrase "an on-line social network" or merely "a social network." It will also be noted that an on-line social network may be any type of an on-line social network, such as, e.g., a professional network, an interest-based network, or any on-line networking system that permits users to join as registered members. For the purposes of this description, registered members of an on-line social network may be referred to as simply members.

Each member of an on-line social network is represented by a member profile (also referred to as a profile of a member or simply a profile). The profile information of a social network member may include personal information such as, e.g., the name of the member, current and previous geographic location of the member, current and previous employment information of the member, information related to education of the member, information about professional accomplishments of the member, publications, patents, etc. The profile information of a social network member may also include information about the member's professional skills, such as, e.g., "product management," "patent prosecution," "image processing," etc.). The profile of a member may also include information about the member's current and past employment, such as company identifications, professional titles held by the associated member at the respective companies, as well as the member's dates of employment at those companies.

An on-line social network system also maintains information about various companies, as well as so-called job postings. A job posting, for the purposes of this description is an electronically stored entity that includes information that an employer may post with respect to a job opening. The information in a job posting may include, e.g., the industry, job position, required and/or desirable skills, geographic location of the job, the name of a company, etc. The on-line social network system includes or is in communication with a so-called recommendation system. A recommendation system is configured to match member profiles with job postings, so that those job postings that have been identified as potentially being of interest to a member represented by a particular member profile are presented to the member on a display device for viewing. In one embodiment, the job postings that are identified as of potential interest to a member are presented to the member in order of relevance with respect to the associated member profile.

Member profiles and job postings are represented in the on-line social network system by feature vectors. The features in the feature vectors may represent, e.g., a job industry, a professional field, a job title, a company name, professional seniority, geographic location, etc. A recommendation engine may be provided in the form of a binary classifier that can be trained using a set of training data. The set of training data can be constructed using historical data that indicates whether a certain job posting presented to a certain member resulted in that member applying for that job. A trained binary classifier may be used to generate, for a (member profile, job posting) pair, a value indicative of the likelihood that a member represented by the member profile applies for a job represented by the job posting. A value indicative of the likelihood that a member represented by the member profile applies for a job represented by the job posting may be referred to as a relevance value or a degree of relevance. Those job postings, for which their respective relevance values for a particular member profile are equal to or greater than a predetermined threshold value, are presented to that particular member, e.g., on the news feed page of the member or on some other page provided by the on-line social networking system. Job postings presented to a member may be ordered based on their respective relevance values, such that those job postings that are determined to be more relevant (where the recommendation system determined that the member is more likely to apply for jobs represented by those listings as opposed to the jobs represented by other postings) are presented in such a manner that they would be more noticeable by the member, e.g. in a higher position in the list of relevant job postings.

A recommendation engine that is provided in the form of a binary classifier trains a binary classification model on the (member profile, job posting) pairs and their corresponding labels that indicate whether or not the member represented by the member profile has applied for the job represented by the job posting. The binary classification model would learn global weights that are optimized to fit all the (member profile, job posting) pairs in the data set. If the binary classification model treats each (member profile, job posting) pair equally, the overall optimization result may be biased towards those member profiles that have been paired with a larger number of job postings as compared to those member profiles that have been paired with a fewer number of job postings. If the binary classification model treats equally each job posting pared with a member profile, regardless, e.g., of whether the associated member viewed the job posting or not, such that the respective positions of job postings in the ranked list are invisible in the learning process, the algorithm may unduly emphasize unimportant or even irrelevant job postings (e.g., those job postings that were ignored and not viewed by a respective member). In the binary classification model, the degree of relevance may not always be well modeled. For instance, it does not take into consideration that even if a member does not apply for certain jobs, a job posting that is impressed but not clicked by the member may be inferred to be less relevant than the one that is impressed and clicked by the same member.

A learning to rank approach may be utilized beneficially to address some of these problems, as it takes into consideration multiple ordered categories of relevance labels, such as, e. g., Perfect>Excellent>Good>Fair>Bad. A learning to rank model can learn from pairwise preference (e.g., job posting A is more relevant than job posting B for a particular member profile) thus directly optimizing for the rank order of job postings for each member profile. With ranking position taken into consideration during training, top-ranked job postings may be treated by the recommendation system as being of more importance than lower-ranked job postings. In addition, a learning to rank approach may also result in an equal optimization across all member profiles and help minimize bias towards those member profiles that have been paired with a larger number of job postings. In one example embodiment, a recommendation system may be configured to produce relevance labels mentioned above automatically without human intervention.

A recommendation system may be configured to generate respective multi-point scale ranking labels for each (member profile, job posting) pairs. The labels indicating different degrees of relevance may be, e.g., in the format of Bad, Fair, Good, Excellent, and Perfect. Using such label data, a recommendation system may train a ranking model (also referred to as a learning to rank model) that may be used by a ranker module of the recommendation system to rank job postings for each member profile, directly optimizing for the order of the ranking results based on a metric such as, e.g., normalized discounted cumulative gain (NDCG).

In one example embodiment, in order to train a learning to rank model, the recommendation system constructs respective five-point labels for (member profile, job posting) pairs, utilizing feedback data collected by automatically monitoring member interactions with job postings that have been presented to them. In one embodiment, the relevance labels are defined as shown below.

Bad ⇔ Random: randomly generated synthetic (member profile, job posting) pair of an active member profile with an active job posting, where the job posting has not been presented to the associated member, at all or for a certain period of time.

Fair ⇔ Impressed: (member profile, job posting) pair, where the job posting has been presented to the associated member (impressed), but there has been no further interaction of the associated member with the job positing, such as a click on the job posting to view the details of the posting.

Good ⇔ Clicked: (member profile, job posting) pair, where the job posting has been presented to the associated member and the recommendation system also detected a click on the job posting to view the details of the posting, but no further event indicative of applying for the associated job has been detected by the recommendation system.

Excellent ⇔ Applied: (member profile, job posting) pair, where the job posting has been presented to the associated member, and the recommendation system also detected that the member clicked on the job posting to view the details and applied for the associated job but did not detect a confirmation that the member has been hired for that job.

Perfect ⇔ Hired: (member profile, job posting) pair, where the recommendation system detected a confirmation that the member has been hired for that job. There are multiple ways to infer hired event within our system, e.g. a) directly through recruiter feedbacks, and b) through members' job change events, which can be further inferred from member updating certain fields of their profile, such as changing of job location, job title and job company.

It will be noted that although, in one embodiment, the recommendation system uses five degrees of relevance, a recommendation system may use a lesser or a greater number of degrees, where each degree of relevance corresponds to a respective temporal sequence of events, each one sequentially closer to the final successful action of a member represented by a member profile applying to a job represented by a job posting. A learning to rank approach described herein may be utilized beneficially in other settings, e.g., where each degree of relevance corresponds to a respective geographic proximity to a given location.

In one example embodiment, a learning to rank model utilized by a recommendation system uses boosted gradient decision trees (BGDT) as the learning to rank algorithm. Once the recommendation system generates multi-point scale relevance labels, it converts these labels into numeric gains and uses the respective Discounted Cumulative Gain (DCG) values as measurements and targets for the model training Table 1 below illustrates how different labels correspond to respective relevance values (identified as "Grade" in Table 1) and respective gains (identified as "Gain" in Table 1).

TABLE 1

| Label | Grade | Gain |
| --- | --- | --- |
| Bad | 0 | 0 |
| Fair | 1 | 1 |
| Good | 2 | 3 |
| Excellent | 3 | 7 |
| Perfect | 4 | 15 |

In Table 1, a Gain value is calculated as expressed in Equation (1) below.

$$\text{Gain} = 2^{Grade} - 1 \quad \text{Equation (1)}$$

The Discounted Cumulative Gain (DCG) from position 1 to position p in the list of results (e.g., in the list of references to recommended job postings) can be defined as expressed below in Equation (2).

$$DCG = \sum_{i=1}^{p} \frac{Gain_i}{\log_2(i+1)}, \quad \text{Equation (2)}$$

where $Gain_i$ is the relevance gain calculated for the item that appears in the list at position i NDCG can then be calculated as the DCG of the rank ordering, divided by the DCG of the ideal ordering (as if returned by an optimal ranker), which is expressed by Equation (3) below. NDCG is always within range [0,1].

$$NDCG = \frac{DCG_{ranker}}{DCG_{ideal}} \quad \text{Equation (3)}$$

As mentioned above, the learning to rank algorithm may be in the form of boosted gradient decision trees and can be directly optimized for NDCG (as list-wise optimization). In Equation (3) above, the $DCG_{ranker}$ is calculated using the rank scores and $DCG_{ideal}$ is calculated using the relevance labels. The error for an intermediate ranker produced during the training process is the difference between DCG_ranker and DCG_ideal, which can be used in the tree training process with gradient decent. A small number of small decision trees (e.g., decision trees with five leaves on each tree) can be trained with boosting, where a relevance score for a job posting with respect to a member profile is calculated as the sum of tree scores calculated for that job posting with respect to that member profile using respective decision trees, which is illustrated in a diagram 300 shown in FIG. 3. A decision tree is constructed to determine a ranking score calculated using respective features or respective sets of features from a (member profile, job posting) pair that is the subject of examination. For example, one of the decision trees may be constructed to analyze respective job title features from the member profile and the job posting, and also to analyze the job company and location features from the job posting. One of the decision nodes from the tree may be to compare to a threshold value the cosine similarity matching score calculated with respect to the job title feature (e.g., represented by a title string) in the member profile and the job title feature from the job posting. Another decision node may be to compare to a threshold value a popularity score indicative of how popular is the company and its location represented by the job company and job location features from the job posting. The terminal nodes (leaf nodes) of a decision tree represent possible outcomes of applying the decision tree to a (member profile, job posting) pair. The outcomes are also referred to as tree scores.

Example method and system to utilize learning to rank modeling in the context of an on-line social network data may be implemented in the context of a network environment 100 illustrated in FIG. 1. As shown in FIG. 1, the network environment 100 may include client systems 110 and 120 and a server system 140. The client system 120 may be a mobile device, such as, e.g., a mobile phone or a tablet. The server system 140, in one example embodiment, may host an on-line social network system 142. As explained above, each member of an on-line social network is represented by a member profile that contains personal and professional information about the member and that may be associated with social links that indicate the member's connection to other member profiles in the on-line social network. Member profiles and related information may be stored in a database 150 as member profiles 152. The database 150 may also store job postings that may be viewed by members of the on-line social network system 142.

The client systems 110 and 120 may be capable of accessing the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in FIG. 1, the server system 140 also hosts a recommendation system 144. The recommendation system 144 may be utilized beneficially to identify and retrieve, from the database 150, the job postings that are identified as of potential interest to a member represented by a member profile. The recommendation system 144 identifies potentially relevant job postings based on respective features that represent the job postings and the member profile. These potentially relevant job postings, which may be identified off-line for each member or on-the-fly in response to a predetermined event (e.g., an explicit request from a member), are presented to the member in order of inferred relevance. The order of presentation may be determined using a learning to rank model, as described above and also further below with respect to FIG. 2-5. A learning to rank model may be trained using the training data stored in the database 150 as training data 154. The training data may be obtained automatically, as described above and also further below. Example architecture 200 of a recommendation system is illustrated in FIG. 2.

Figure 2:
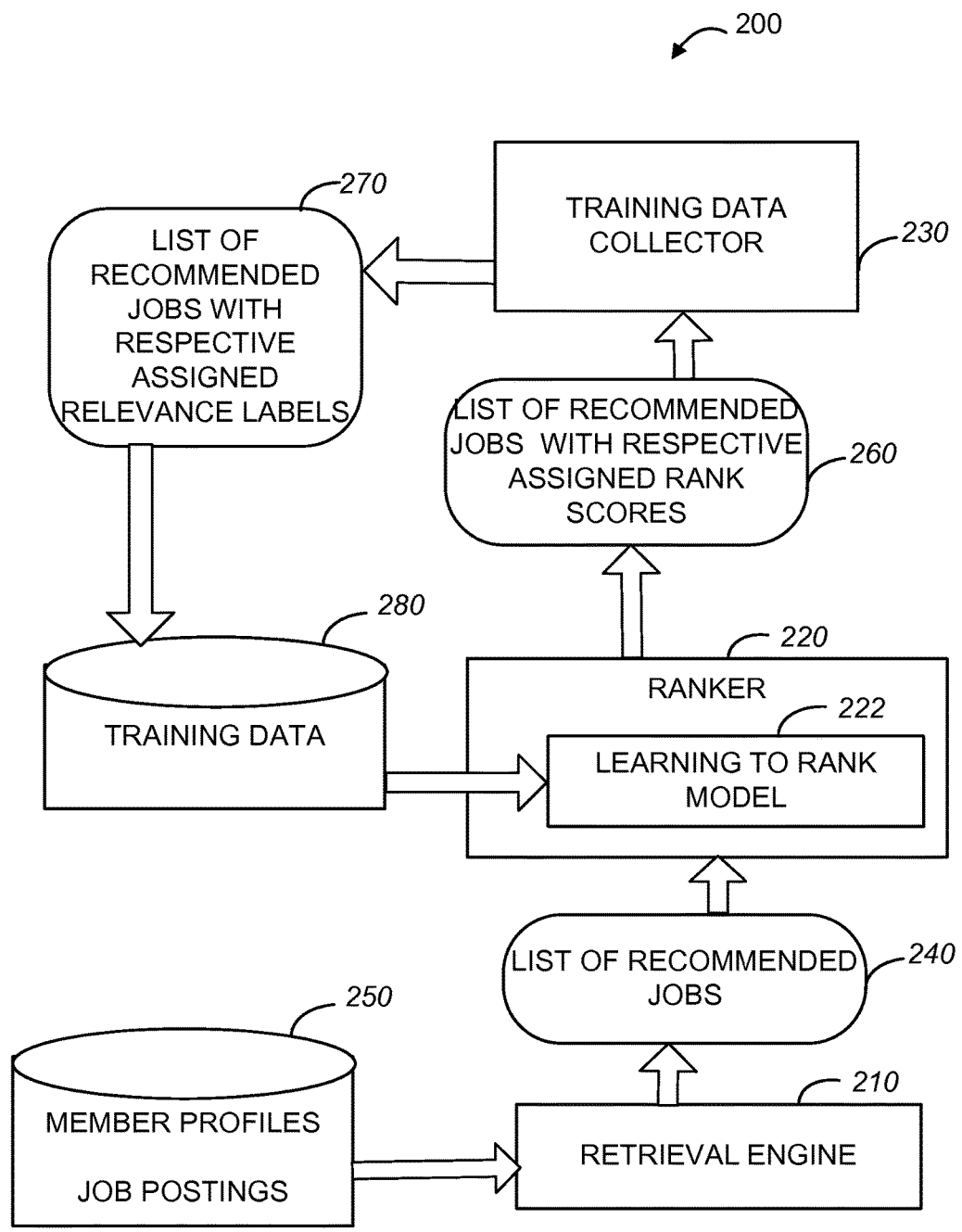
FIG. 2 is a diagram of an architecture for learning to rank modeling in the context of an on-line social network data, in accordance with one example embodiment.
Figure 3:
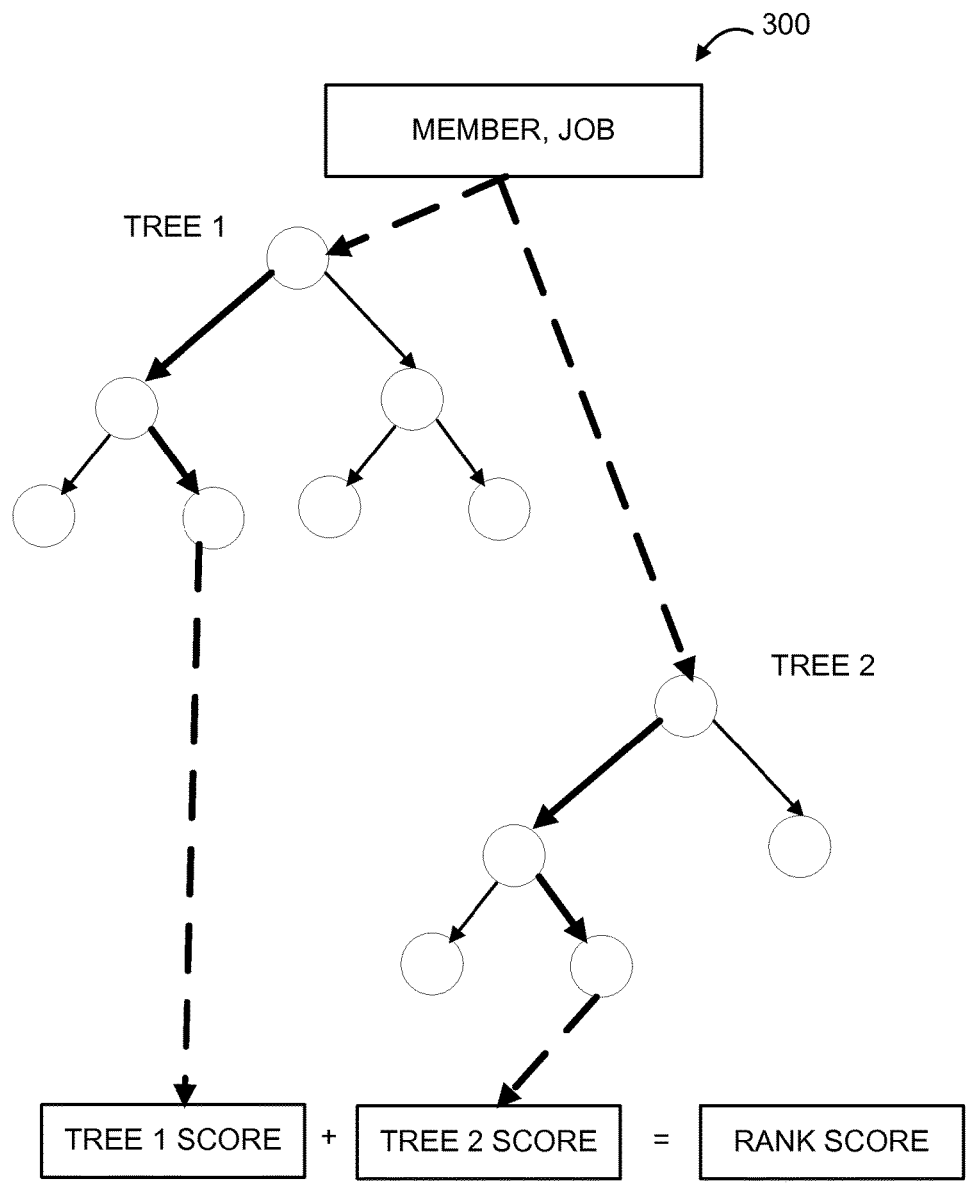
FIG. 3 is an illustration of the use of decision trees as a learning to rank algorithm, in accordance with one example embodiment.

As shown in FIG. 2, the architecture 200 includes a retrieval engine 210, a ranker 220, and a training data collector 230. The retrieval engine 210 retrieves a list of recommended jobs 240 from a database 250 for a particular member profile. The list of recommended jobs 240 may be in a format {member ID (job_posting_ID$_1$, ..., job_posting_ID$_n$)}, where member ID is a reference to a member profile and job_posting_ID$_i$ items are references to job postings that have been determined as being potentially of interest to a member represented by the member profile in the on-line social network system 142 of FIG. 1. The ranker 220 executes a learning to rank model 222 with respect to the list of recommended jobs 240 to generate a respective rank score for each item in the list. The learning to rank model 222 may use boosted gradient decision trees as a learning to rank algorithm, where the terminal leaves in a decision tree represent relevance scores that can be attributed to a job posting with respect to a member profile. A rank score for an item in the list is calculated as the sum of rank scores determined for each of the decision trees, as shown in diagram 300 of FIG. 3. In FIG. 3, the thicker edges show the decision tracks.

Returning to FIG. 2, the rank scores calculated by the learning to rank model 222 are assigned to the items in the list of recommended jobs 240. A list of recommended jobs with respective assigned rank scores 260 is provided to the training data collector 230. The training data collector 230 monitors events with respect to how the member, for whom the list of recommended jobs 240 was generated, interacts with the associated job postings and, based on the monitors interactions, assigns relevance labels to the items in the list. As explained above, a job posting that is impressed and clicked by the associated member receives a different relevance score from a relevance label assigned to a job posting that was impressed but not clicked by the associated member. A list of recommended jobs with respective assigned relevance labels 270 is provided to a repository of training data 280. The training data stored in the database 280 is used to train the learning to rank model 222. As explained above, the learning to rank model 222 can be optimized for NDCG using the Equation (3) above, where $DCG_{ranker}$ is calculated using the rank scores and $DCG_{ideal}$ is calculated using the relevance labels.

Figure 4:
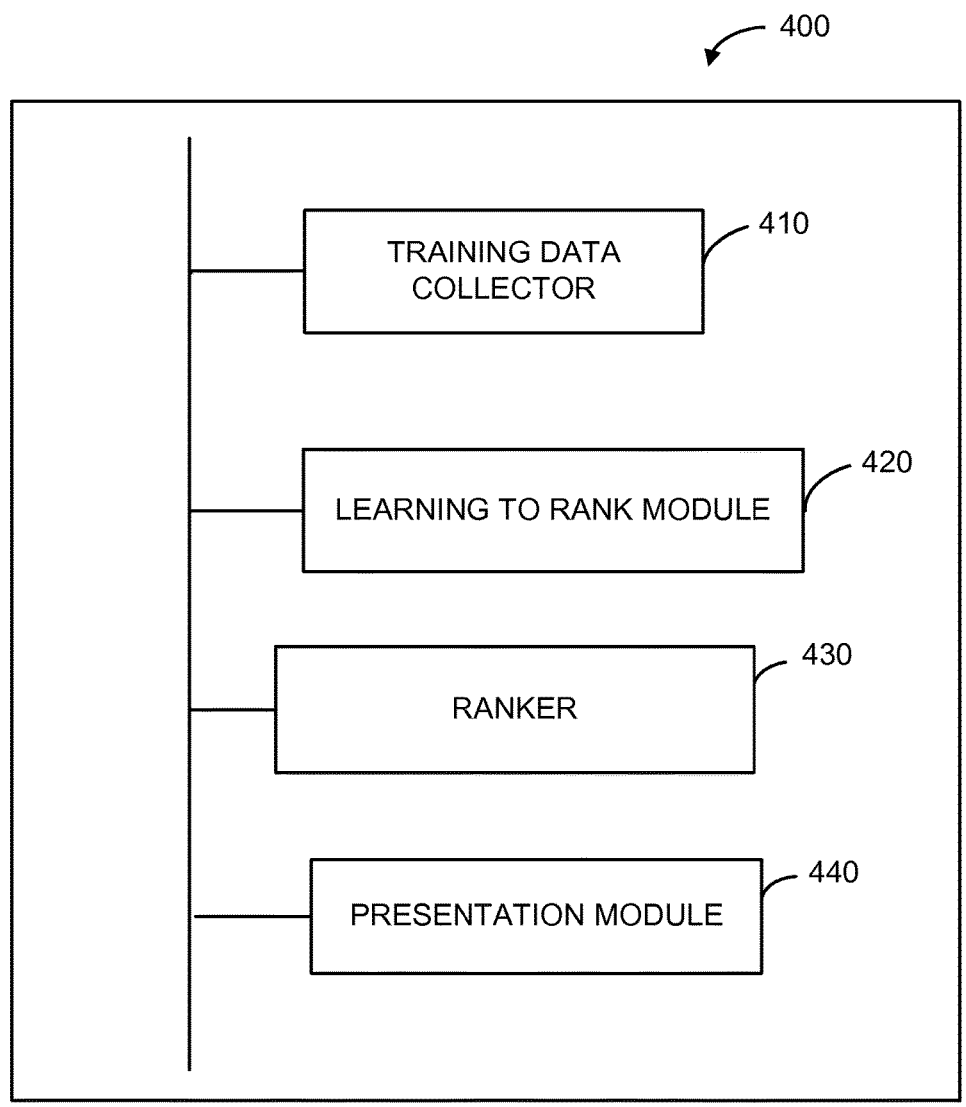
FIG. 4 is block diagram of a recommendation system, in accordance with one example embodiment.

An example recommendation system 144 of FIG. 1 is illustrated in FIG. 4. FIG. 4 is a block diagram of a system 400 to utilize learning to rank modeling in the context of an on-line social network data, in accordance with one example embodiment. As shown in FIG. 4, the system 400 includes a training data collector 410, a learning to rank module 420, a ranker 430, and a presentation module 440. The training data collector 410 is configured to collect training data. The training data, as explained above, comprises a plurality of job lists (also referred to as lists of recommended job postings). Each job list from the plurality of job lists comprises respective identifications of a plurality of job postings, each identification of a job posting from the plurality of job postings is assigned a relevance label indicating a grade of relevance of that job posting with respect to a member profile associated with that job list. A job list may be in the form as shown below.

$$\{memberID\ JobPostingID_1,\ label_1\},$$
$$...$$
$$JobPostingID_n,\ label_n)\}$$

In operation, the training data collector 410, which corresponds to the training data collector 230 of FIG. 2, accesses a previously generated recommended jobs list associated with a member profile, monitors and collects events data with respect to interactions of the member represented by the member profile with the recommended jobs list. Based on the events data, the training data collector 410 assigns respective relevance labels to items in the recommended jobs list. The recommended jobs list with the assigned respective relevance labels is stored as training data, e.g., in the database 280 of FIG. 2. In one embodiment, the training data collector assigns a "Good" relevance label to an item in the recommended jobs list responsive to detecting that the member viewed a job posting represented by the item, an "Excellent" relevance label responsive to detecting that the member applied to a job posting represented by the item, and a "Bad" relevance label responsive to detecting an absence of a viewing, by the member, of a job posting represented by the item.

The learning to rank module 420 is configured to learn a ranking model (a learning to rank model) using relevance labels from the training data and rank scores calculated for (member profile, job posting) pairs from the training data. The learning to rank module 420 optimizes the ranking model for normalized discounted cumulative gain value with respect to discounted cumulative gain value calculated using the relevance labels from the training data and discounted cumulative gain value calculated using the rank scores. In one embodiment, the ranking model is in the form of a plurality of decision trees, and a rank score for a (member profile, job posting) pair from the training data is calculated as the sum of relevance scores, each one of the relevance scores calculated by executing a respective decision tree from the plurality of decision trees utilizing feature values from the (member profile, job posting) pair. A value from the feature values from the (member profile, job posting) pair may be indicative of a professional title, a geographic location, a company name, etc.

The ranker 430 is configured to access a recommended jobs list, which may be generated by the retrieval engine 210 of FIG. 2 and execute the ranking model to determine respective rank scores for items in the recommended jobs list. The presentation module 440 causes the items from the recommended jobs list to be presented on a display device in an order based on the determined respective rank scores. Some operations performed by the system 400 may be described with reference to FIG. 5.

Figure 5:
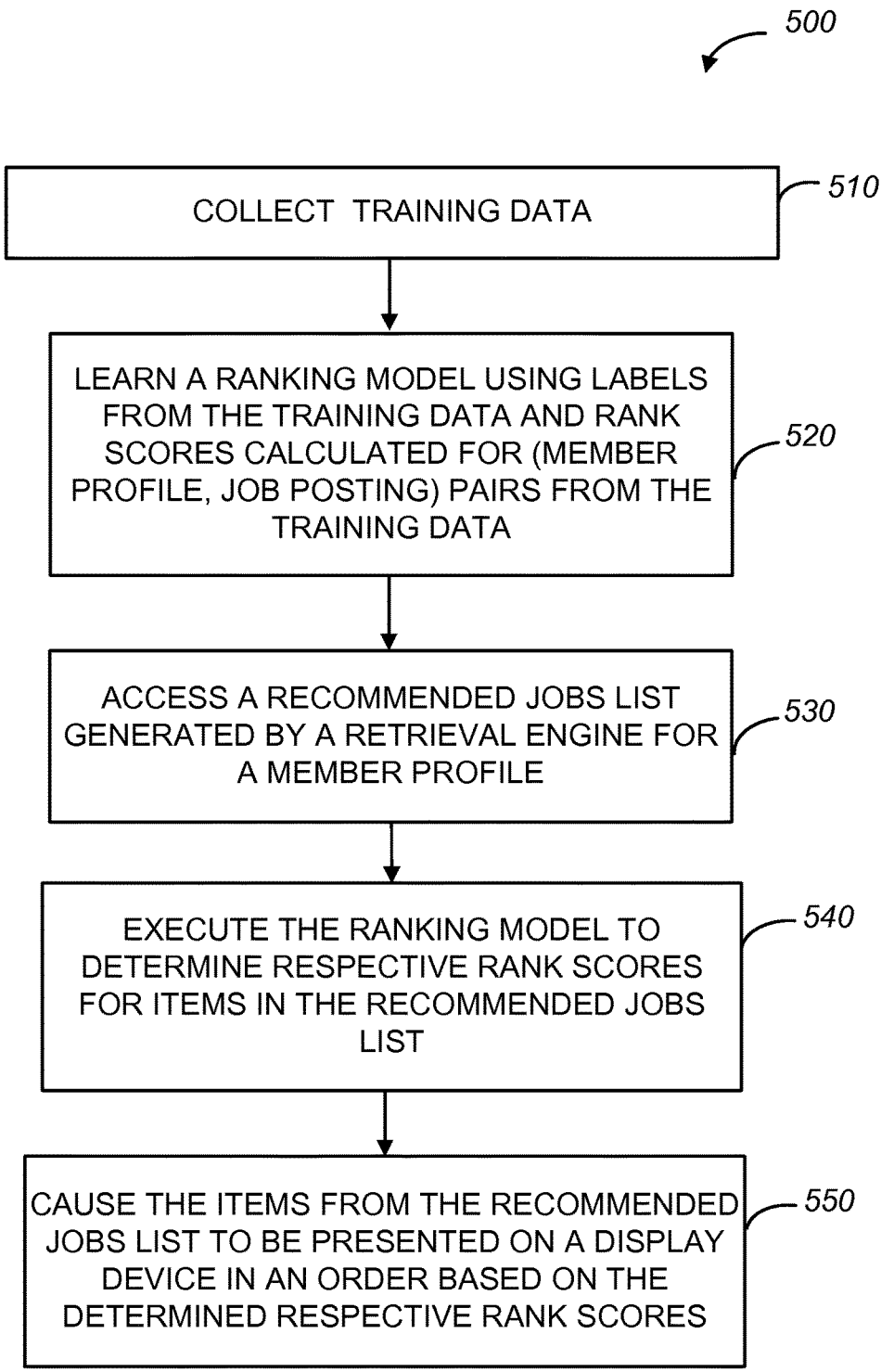
FIG. 5 is a flow chart of a method to utilize learning to rank modeling in the context of an on-line social network data, in accordance with an example embodiment.

FIG. 5 is a flow chart of a method 500 to utilize learning to rank modeling in the context of an on-line social network data to a social network member, according to one example embodiment. The method 500 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 400 shown in FIG. 4.

As shown in FIG. 5, the method 500 commences at operation 510, when the training data collector 410 of FIG. 4 collects training data, which is then stored in the database 280 of FIG. 2. The training data is in the form of lists of respective identifications of job postings, where each list is generated for a particular member profile and where each jib posting identification is associated with a relevance label, as shown below.

$$\{memberID\ JobPostingID_1,\ label_1\},$$
$$...$$
$$JobPostingID_n,\ label_n)\}$$

At operation 520, the learning to rank module 420 of FIG. 4 learns a ranking model using the relevance labels from the training data and the rank scores calculated for (member profile, job posting) pairs from the training data, e.g., using boosted gradient decision trees. At operation 530, the ranker 430 of FIG. 4 accesses a recommended jobs list, which may be generated by the retrieval engine 210 of FIG. 2 and executes the ranking model, at operation 540, to determine respective rank scores for items in the recommended jobs list. The presentation module 440 causes the items from the recommended jobs list to be presented on a display device in an order based on the determined respective rank scores, at operation 550.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Figure 6:
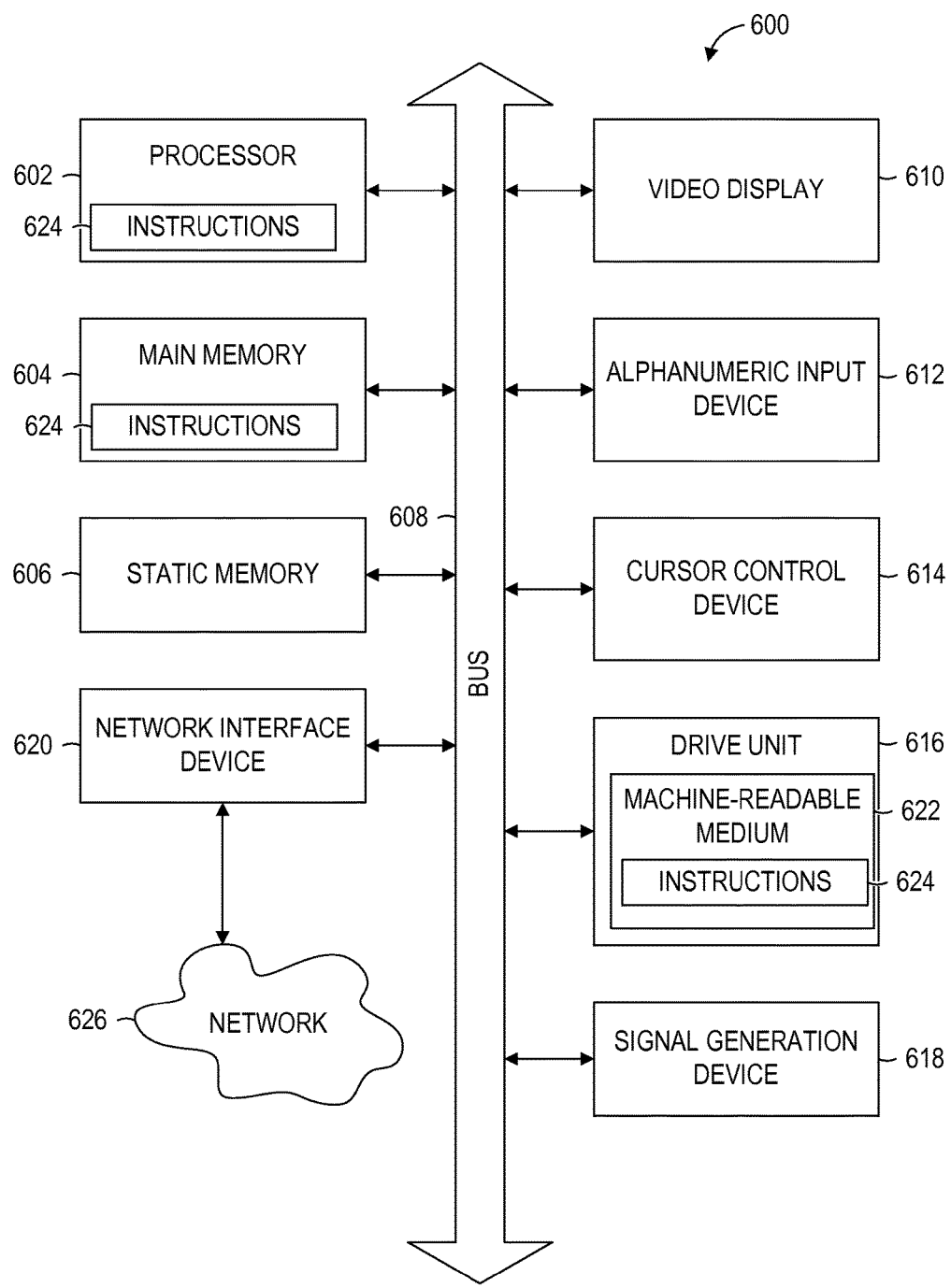
FIG. 6 is a diagrammatic representation of an example machine in the form of a computer system within which a set of instructions, for causing the machine to perform any one or more of the methodologies discussed herein, may be executed.

FIG. 6 is a diagrammatic representation of a machine in the example form of a computer system 600 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 606. The computer system 600 may further include a video display unit 610 (e.g., a liquid crystal display (LCD) or a cathode ray tube (CRT)). The computer system 600 also includes an alpha-numeric input device 612 (e.g., a keyboard), a user interface (UI) navigation device 614 (e.g., a cursor control device), a disk drive unit 616, a signal generation device 618 (e.g., a speaker) and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, with the main memory 604 and the processor 602 also constituting machine-readable media.

The software 624 may further be transmitted or received over a network 626 via the network interface device 620 utilizing any one of a number of well-known transfer protocols (e.g., Hyper Text Transfer Protocol (HTTP)).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, learning to rank modeling in the context of an on-line social network has been described. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:

1. A computer-implemented method comprising:
   in an on-line social network system, accessing a recommended jobs list for a member profile representing a member in the on-line social network system, the recommended jobs list comprising items representing respective job postings maintained in the on-line social network system;
   executing a ranking model to determine respective rank scores for items in the recommended jobs list;
   causing the items from the recommended jobs list to be presented on a display device of the member in an order based on the determined respective rank scores for the items in the recommended jobs list;
   collecting events data representing interactions of the member with items from the recommended jobs list that was caused to be presented on the display device of the member;
   based on the collected events data, generating a first relevance label in response to determining that the member accessed a job posting represented by the item and generating a second relevance label from the recommended jobs list in response to determining that the member did not access another job posting represented by the other item;
   assigning the first relevance label to a first subject pair comprising the member profile and the job posting represented by the item from the recommended jobs list;
   assigning the second relevance label to a second subject pair comprising the member profile and the other job posting represented by the other item from the recommended jobs list; and
   using the first subject pair with the first relevance label and the second subject pair with the second relevance label as training data for learning the ranking model.

2. The method of claim 1, wherein the learning of the ranking model comprises optimizing the ranking model for normalized discounted cumulative gain value with respect to discounted cumulative gain value calculated using the relevance labels from the training data and discounted cumulative gain value calculated using the rank scores.

3. The method of claim 1, wherein the determining of the respective rank scores comprises using a plurality of decision trees, a rank score for a (member profile, job posting) pair from the training data calculated as the sum of relevance scores, each one of the relevance scores calculated by executing a respective decision tree from the plurality of decision trees utilizing feature values from the (member profile, job posting) pair.

4. The method of claim 3, wherein trees from the plurality of decision trees, are boosted gradient decision trees.

5. The method of claim 3, wherein a value from the feature values from the (member profile, job posting) pair is indicative of a professional title or a geographic location.

6. The method of claim 1, comprising:
storing the recommended jobs list having assigned relevance labels to its items with the training data.

7. The method of claim 6, comprising assigning a first relevance label to a first item in the recommended jobs list responsive to detecting that the member viewed a job posting represented by the first item.

8. The method of claim 6, comprising assigning a second relevance label to a first item in the recommended jobs list responsive to detecting that the member applied to a job posting represented by the first item.

9. The method of claim 6, comprising assigning a third relevance label to a first item in the recommended jobs list responsive to detecting an absence of a viewing, by the member, of a job posting represented by the first item.

10. The method of claim 1, wherein the generating of the recommended jobs list for the member profile is performed off-line on a periodic basis.

11. A computer-implemented system comprising:
a ranker, implemented using at least one processor, to:
access a recommended jobs list in an on-line social network system for a member profile representing a member in the on-line social network system, the recommended jobs list comprising items representing respective job postings maintained in the on-line social network system, and
execute a ranking model to determine respective rank scores for items in the recommended jobs list;
a presentation module, implemented using at least one processor, to cause the items from the recommended jobs list to be presented on a display device of the member in an order based on the determined respective rank scores for the items in the recommended jobs list;
a training data collector, implemented using at least one processor, to:
collect events data representing interactions of the member with items from the recommended jobs list that was caused to be presented on the display device of the member,
based on the collected events data, generate a first relevance label in response to determining that the member accessed a job posting represented by the item and generating a second relevance label from the recommended jobs list in response to determining that the member did not access another job posting represented by the other item,
assign the first relevance label to a first subject pair comprising the member profile and the job posting represented by the item from the recommended jobs list, and
assign the second relevance label to a second subject pair comprising the member profile and the other job posting represented by the other item from the recommended jobs list; and
a learning to rank module, implemented using at least one processor, to learn the ranking model using the first subject pair with the first relevance label and the second subject pair with the second relevance label as training data.

12. The system of claim 11, wherein the learning to rank module is to optimize the ranking model for normalized discounted cumulative gain value with respect to discounted cumulative gain value calculated using the relevance labels from the training data and discounted cumulative gain value calculated using the rank scores.

13. The system of claim 11, wherein the ranking model is in the form of a plurality of decision trees, a rank score for a (member profile, job posting) pair from the training data calculated as the sum of relevance scores, each one of the relevance scores calculated by executing a respective decision tree from the plurality of decision trees utilizing feature values from the (member profile, job posting) pair.

14. The system of claim 13, wherein trees from the plurality of decision trees, are boosted gradient decision trees.

15. The system of claim 13, wherein a value from the feature values from the (member profile, job posting) pair is indicative of a professional title or a geographic location.

16. The system of claim 11, wherein the training data collector is to:
store the recommended jobs list having assigned relevance labels to its items with the training data.

17. The system of claim 16, wherein the training data collector is to assign a first relevance label to a first item in the recommended jobs list responsive to detecting that the member viewed a job posting represented by the first item.

18. The system of claim 16, wherein the training data collector is to assign a second relevance label to a first item in the recommended jobs list responsive to detecting that the member applied to a job posting represented by the first item.

19. The system of claim 16, wherein the training data collector is to assign a third relevance label to a first item in the recommended jobs list responsive to detecting an absence of a viewing, by the member, of a job posting represented by the first item.

20. A machine-readable non-transitory storage medium having instruction data executable by a machine to cause the machine to perform operations comprising:
in an on-line social network system, accessing a recommended jobs list for a member profile representing a member in the on-line social network system, the recommended jobs list comprising items representing respective job postings maintained in the on-line social network system;
executing a ranking model to determine respective rank scores for items in the recommended jobs list;
causing the items from the recommended jobs list to be presented on a display device of the member in an order based on the determined respective rank scores for the items in the recommended jobs list;
collecting events data representing interactions of the member with items from the recommended jobs list that was caused to be presented on the display device of the member;
based on the collected events data, generating a first relevance label in response to determining that the member accessed a job posting represented by the item and generating a second relevance label from the recommended jobs list in response to determining that the member did not access another job posting represented by the other item;
assigning the first relevance label to a first subject pair comprising the member profile and the job posting represented by the item from the recommended jobs list;
assigning the second relevance label to a second subject pair comprising the member profile and the other job posting represented by the other item from the recommended jobs list; and
using the first subject pair with the first relevance label and the second subject pair with the second relevance label as training data for learning the ranking model.

* * * * *

UNITED STATES PATENT AND TRADEMARK OFFICE
CERTIFICATE OF CORRECTION

PATENT NO. : 9,626,654 B2  
APPLICATION NO. : 14/788711  
DATED : April 18, 2017  
INVENTOR(S) : Tang et al.

Page 1 of 1

It is certified that error appears in the above-identified patent and that said Letters Patent is hereby corrected as shown below:

On the Title Page

In item (73), in "Assignee", in Column 1, Line 1, delete "Sunnyvale," and insert --Mountain View,-- therefor In the Claims In Column 12, Line 66, in Claim 5, delete "the(member" and insert --the (member-- therefor Signed and Sealed this
Seventeenth Day of April, 2018

Andrei Iancu
*Director of the United States Patent and Trademark Office*